(12) United States Patent
Bass et al.

(10) Patent No.: US 6,862,292 B1
(45) Date of Patent: Mar. 1, 2005

(54) METHOD AND SYSTEM FOR NETWORK PROCESSOR SCHEDULING OUTPUTS BASED ON MULTIPLE CALENDARS

(75) Inventors: Brian Mitchell Bass, Apex, NC (US); Jean Louis Calvignac, Cary, NC (US); Marco C. Heddes, Raleigh, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,910

(22) Filed: Apr. 13, 2000

(51) Int. Cl.[7] .......................... H04L 12/28; H04L 12/56
(52) U.S. Cl. ....................... 370/414; 370/428; 370/235; 710/52
(58) Field of Search ................................ 370/229, 230, 370/230.1, 231, 232, 233, 234, 235, 235.1, 389, 392, 395.1, 395.4, 395.41, 395.42, 401, 412, 415, 416, 417, 418, 428, 429, 465, 468; 710/52, 54, 56, 5, 6

(56) References Cited

U.S. PATENT DOCUMENTS

| | | | |
|---|---|---|---|
| 5,367,523 A | | 11/1994 | Chang et al. ................. 370/84 |
| 5,629,937 A | * | 5/1997 | Hayter et al. ............... 370/233 |
| 5,689,508 A | | 11/1997 | Lyles ........................ 370/391 |
| 5,734,650 A | * | 3/1998 | Hayter et al. ............... 370/391 |
| 5,781,531 A | | 7/1998 | Charny ....................... 370/232 |
| 5,793,747 A | | 8/1998 | Kline ......................... 370/230 |
| 5,818,839 A | * | 10/1998 | Sterne et al. ............... 370/391 |
| 5,835,494 A | * | 11/1998 | Hughes et al. .............. 370/397 |
| 5,850,399 A | | 12/1998 | Ganmukhi et al. .......... 370/412 |
| 5,917,822 A | | 6/1999 | Lyles et al. ................. 370/395 |
| 5,923,644 A | | 7/1999 | McKeon et al. ............ 370/230 |
| 5,923,656 A | | 7/1999 | Duan et al. ................. 370/395 |
| 5,926,459 A | | 7/1999 | Lyles et al. ................. 370/230 |
| 5,940,375 A | | 8/1999 | Soumiya et al. ............ 370/249 |
| 5,959,993 A | | 9/1999 | Varma ........................ 370/397 |
| 5,995,511 A | | 11/1999 | Zhou et al. ................. 370/412 |
| 5,996,019 A | | 11/1999 | Hauser et al. .............. 709/235 |
| 6,091,740 A | * | 7/2000 | Karasawa ................... 370/458 |
| 6,101,193 A | * | 8/2000 | Ohba ......................... 370/429 |
| 6,262,986 B1 | * | 7/2001 | Oba et al. ................... 370/399 |
| 6,320,845 B1 | * | 11/2001 | Davie ......................... 370/230 |
| 6,438,106 B1 | * | 8/2002 | Pillar et al. ................. 370/232 |
| 6,438,134 B1 | * | 8/2002 | Chow et al. ................ 370/412 |
| 6,452,933 B1 | * | 9/2002 | Duffield et al. ............. 370/415 |

FOREIGN PATENT DOCUMENTS

| | | | |
|---|---|---|---|
| EP | 0944208 | 9/1999 | .......... H04L/12/56 |
| WO | WO 97/14240 | 4/1997 | .......... H04L/12/56 |

OTHER PUBLICATIONS

PCT International Search Report dated Nov. 6, 2001.
IBM Technical Disclosure Bulletin, vol. 35, No. 2, Jul., 1992, pp. 233–239 "Architecture for High Performance Transparent Bridge".

* cited by examiner

*Primary Examiner*—Bob A. Phunkulh
(74) *Attorney, Agent, or Firm*—Joscelyn G. Cockburn; Kenneth A. Seaman

(57) ABSTRACT

A system and method of moving information units from a network processor toward a data transmission network in a prioritized sequence which accommodates several different levels of service. The present invention includes a method and system for scheduling the egress of processed information units (or frames) from a network processing unit according to stored priorities associated with the various sources of the information units. The priorities in the preferred embodiment include a low latency service, a minimum bandwidth, a weighted fair queueing and a system for preventing a user from continuing to exceed his service levels over an extended period. The present invention includes a plurality of calendars with different service rates to allow a user to select the service rate which he desires. If a customer has chosen a high bandwidth for service, the customer will be included in a calendar which is serviced more often than if the customer has chosen a lower bandwidth.

15 Claims, 5 Drawing Sheets

METHOD AND SYSTEM FOR NETWORK PROCESSOR SCHEDULING OUTPUTS BASED ON MULTIPLE CALENDARS

CROSS REFERENCE TO RELATED PATENTS

The present invention is related to the following documents, all of which are assigned to the assignee of the present invention and which are specifically incorporated herein by reference:

Patent application Ser. No. 09/384,691, filed Aug. 27, 1999 by Brian Bass et al., entitled "Network Processor Processing Complex and Methods", sometimes referred to herein as the Network Processing Unit Patent or NPU Patent.

U.S. Pat. No. 5,724,348 entitled "Efficient Hardware/Software interface for a Data Switch" issued Mar. 3, 1998, which patent is sometimes referred to herein as the Interface Patent.

Patent application Ser. No. 09/330,968 filed Jun. 11, 1999 and entitled "High Speed Parallel/Serial Link for Data Communications", sometimes referred to as the Link Patent.

Various patents and applications assigned to IBM for its multiprotocol switching services, sometimes referred to as "MSS", some of which include Cedric Alexander as an inventor, and are sometimes referred to as the MSS Patents.

Patent application Ser. No. 09/548,907 filed concurrently by Brian M. Bass et al. and entitled "Method and System for Network Processor Scheduler". This patent is sometimes referred to herein as the Scheduler Structure Patent.

Patent application Ser. No. 09/548,911 filed concurrently by Brian M. Bass et al. and entitled "Method and System for Network Processor Scheduling Based on Calculation". This patent is sometimes referred to herein as the Calculation Patent.

Patent application Ser. No. 09/834,141 filed concurrently by Brian M. Bass et al. and entitled "Method and System for Network Processor Scheduling Based on Service Levels". This patent is sometimes referred to herein as the Service Level Patent.

Patent application Ser. No. 09/548,912 filed concurrently by Brian M. Bass et al. and entitled "Method and System for Network Processor Scheduling Outputs Using Queueing". This patent is sometimes referred to herein as the Queueing Patent.

Patent application Ser. No. 09/548,913 filed concurrently by Brian M. Base et al. and entitled "Method and System for Network Processor Scheduling Outputs using Disconnect/Reconnect Flow Queues". This patent is sometimes referred to herein as the Reconnection Patent.

Patent application Ser. No. 09/546,651 filed Apr. 10, 2000 by Brian M. Bass et al., and entitled "Method and System for Minimizing Congestion in a Network". This patent is sometimes referred to herein as the Flow Control Patent.

Patent application Ser. No. 09/547,280 filed Apr. 11, 2000 and entitled "Unified Method and System for Scheduling and Discarding Packets in Computer Networks". This patent is sometimes referred to herein as the Packet Discard Patent.

BACKGROUND OF THE INVENTION

1. Field of the Invention

The present invention relates to communication network apparatus such as is used to link together information handling systems or computers of various types and capabilities and to components and methods for data processing in such an apparatus. The present invention includes an improved system and method for scheduling the distribution of information units from a flow control system coupled to a plurality of network processing units toward a data transmission network through a MAC. More particularly, the present invention involves scheduling using a plurality of calendars to handle a plurality of users who are processing variable size information packets or frames, providing an order to the frames being provided from the flow control system (which may be of the type described in the referenced Flow Control Patent) toward the data transmission network while allowing for a plurality of different priorities to be accorded to the different users.

2. Background Art

The description of the present invention which follows is based on a presupposition that the reader has a basic knowledge of network data communications and the routers and switches which are useful in such network communications. In particular, this description presupposes familiarity with the International Standards Organization ("ISO") model of network architecture which divides network operation into layers. A typical architecture based on the ISO model extends from a Layer 1 (which is sometimes referred to a "L1") being the physical pathway or media through which signals are passed upward through Layers 2 (or "L2"), 3 (or "L3"), and so forth to Layer 7 which is the layer of application programming resident in a computer system linked to the network. Throughout this document, references to such layers as L1, L2, L3 are intended to refer to the corresponding layer of the network architecture. The present description also is based on a fundamental understanding of bit strings used in network communication known as packets and frames.

Bandwidth considerations (or the amount of data which a system can handle in a unit of time) are becoming important in today's view of network operations. Traffic over networks is increasing, both in sheer volume and in the diversity of the traffic. At one time, some networks were used primarily for a certain type of communications traffic, such as voice on a telephone network and digital data over a data transmission network. Of course, in addition to the voice signals, a telephone network would also carry a limited amount of "data" (such as the calling number and the called number, for routing and billing purposes), but the primary use for some networks had, at one point in time, been substantially homogenous packets.

A substantial increase in traffic has occurred as a result of the increasing popularity of the Internet (a public network of loosely linked computers sometimes referred to as the worldwide web or "www.") and internal analogs of it (sometimes referred to as intranets) found in private data transmission networks. The Internet and intranets involve transmission of large amounts of information between remote locations to satisfy an ever-growing need for remote access to information and emerging applications. The Internet has opened up to a large number of users in geographically dispersed areas an exploding amount of remote information and enabled a variety of new applications, such as e-commerce, which has resulted in a greatly-increased load on networks. Other applications, such as e-mail, file transfer and database access further add load to networks, some of which are already under strain due to high levels of network traffic.

Voice and data traffic are also converging onto networks at the present time. Data is currently transmitted over the Internet (through the Internet Protocol or IP) at no charge, and voice traffic typically follows the path of lowest cost Technologies such as voice over EP (VoIP) and voice over asynchronous transfer mode or ATM (VoATM) or voice over frame relay (VoFR) are cost-effective alternatives for transmission of voice traffic in today's environment. As these services migrate, the industry will be addressing issues such as the changing cost structure and concerns over the trade off between cost of service and quality of service in the transmission of information between processors.

Aspects of quality of service include the capacity or bandwidth (how much information can be accommodated in a period of time), the response time (how long does it take to process a frame) and how flexible is the processing (does it respond to different protocols and frame configurations, such as different encapsulation or flame header methods). Those using a resource will consider the quality of service as well as the cost of service, with the tradeoffs depending on the situation presented. It is desirable to allow a variety of different priorities or scheduling algorithms to a user, with the user deciding whether he wants (and will pay the charges associated with) a guaranteed bandwidth, best efforts, or a guaranteed bandwidth with best efforts for peak. In addition, it is desirable that a system for allocating bandwidth have a system for enforcing the priorities and bandwidth which has been selected by a user by denying the user capacity in excess of that which the user has selected and paid for.

Some prior art systems handle outgoing information units from a processing system in a variety ways. One suggestion is to use a round robin scheduler with fairness amongst a set of queues. Another one employs several different levels of priorities and a queue for each. In such a system, you have an absolute priority where the highest priority work is processed first and the lowest priority work may never get serviced. Still another method of scheduling outputs involves a plurality of prioritized lists. It is also known to use a hierarchical packet scheduling system. There are even systems which use several different scheduling methods in determining the order in which information units are to be sent toward a data transmission network using a combination of different scheduling techniques.

Other systems have used a weighted priority technique implemented in the form of a round robin–which serves all queues, with some queues served more frequently than other queues, based on an algorithm which defines the level of service. Even such a weighted priority system would provide service to a user who continually exceeds the service levels assigned to it, continuing to serve, albeit less often, even as it exceeds the assigned service level and making it difficult for the system to enforce a level of service policy.

Considering the size of a packet or frame in determining which customers to serve adds a measure of fairness to a service system, in that a user who is processing large frames takes up more of the system capacity and therefore should receive service less often than a user with small frames. Some of the prior art systems consider the size of the transmission in allocating resources, while others do not. Some communication systems use a uniform, fixed-size packet, making consideration of packet size unnecessary, but others do not consider the size of the packet in allocating resources.

Other prior art system are directed to handling information units which are of a common size as in the so-called Asynchronous Transfer Mode (or ATM) system, so that size of the information unit is not considered in determining the priority of the current or a future information unit An ATM system with a weight-driven scheduler is one of the solutions which is known in the prior art to schedule outputs from an ATM system.

In any such system, it would be desirable to accommodate system constraints like allocating a certain guaranteed bandwidth to a customer regardless of frame size while providing a mechanism to provide the following additional features: accommodating peak inputs which exceed the guaranteed bandwidth while providing protection for large and persistent exceeding of a system parameter and yet efficiently and equitably use the capacity of the network processor to provide outputs to the data transmission network.

It would be desirable to have a system which has maximum flexibility to allow for different types and levels of service as desired. For example, some users want a minimum bandwidth, others might want a minimum bandwidth but allows for bursts, still others may be interested in an economy service which provides for a "best effort" service, either with or without a minimum bandwidth, and any limits on bandwidth or burst size must be enforceable by the scheduling system. It would be desirable if a scheduling system could have any or all of these features in a simple and efficient system which accommodates variable packet length and provides for a weighted fair queueing system of allocating unused bandwidth, but, unfortunately such systems do not exist in the prior art.

Thus, the prior art systems for handling data packets for transmission to a network have undesirable disadvantages and limitations which had an effect either on the versatility of the system or the speed with which it could operate.

SUMMARY OF THE INVENTION

The present invention overcomes the disadvantages and limitations of the prior art systems by providing a simple, yet effective, way of handling information units or frames coming out of a processing system and directing frames to output ports for dispatch to a data transmission network. The present invention has particular application to a system in which packets of variable length are being handled from a plurality of users and where a level of service commitment has been made to at least some of the users.

The present invention allows the use of multiple types of service level agreements or commitments made to different users of the system. That is, a minimum guaranteed bandwidth could be provided to one user while other users enjoy shared bandwidth, a peak bandwidth could be permitted for a limited duration of time and maximum burst level service could be provided to a user, all as programmed and without interfering with the service provided to other users.

The present invention has the advantage that it allows the efficient use of bandwidth resource and allows for service level commitments to be fulfilled while allowing any remaining bandwidth to be used efficiently and equitably.

The present invention also has the advantage of enforcing resource allocations while accommodating bursts. That is, a user can transmit some amount of traffic at a burst rate which exceeds his defined bandwidth for a limited period of time, but, if the user does so for a prolonged period, that user is prohibited from transmitting in excess of his normal bandwidth until he has compensated for the excessive usage. This is accomplished through a system of "credits" for the flow queue for the respective user which have built up while the user was not using his full bandwidth.

The present system also has the advantage of providing a push down stack in which the latest request for service scheduled for a given time slot or cycle is given priority. This is based on the assumption that the user scheduled later must have a higher priority and any delay in serving that user would be a greater percentage delay than a similar delay in serving a lower priority user. Use of this last-in-first-out (LIFO) system for fulfilling slot requests allows the system to minimize the perceived delay in service as a percentage of the normal intervals between successive service when the system is overloaded, that is, it has more work than can be handled at the scheduled time.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
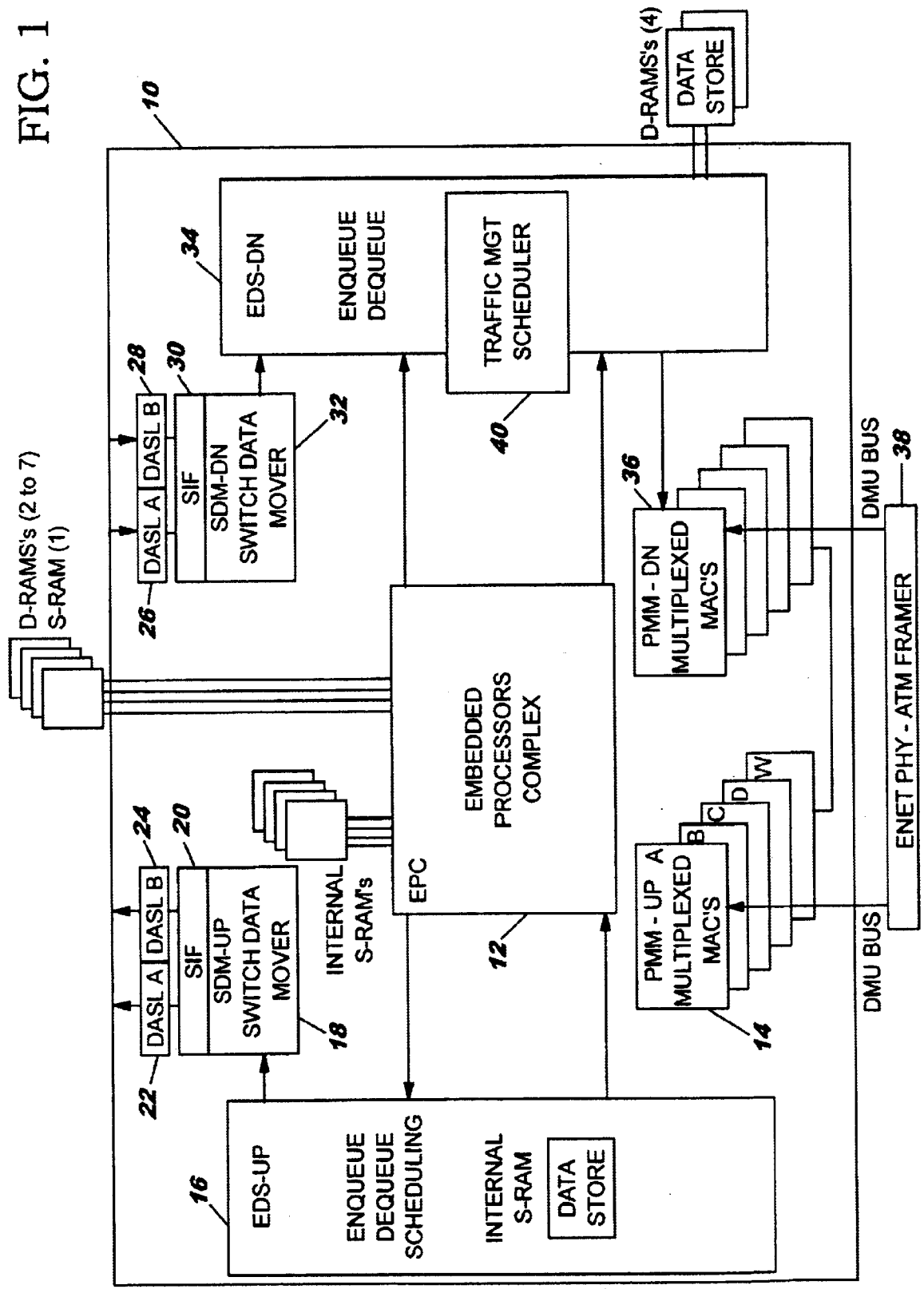
FIG. 1 is a block diagram for an interface device including embedded processor complex which is described in the NPU Patent, showing a DN Enqueue System and Scheduler useful in practicing the present invention.

FIG. 1 shows a block diagram of the interface device chip that includes the substrate 10 and a plurality of subassemblies integrated on the substrate. The sub-assemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, Switch Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, switch interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors. After the input units or frames are processed by one of the plurality of processors in the embedded processor complex, the completed information units are sent to the switch to be delivered to an egress side of a network processor. Once the information units are received on the ingress side of the network processor, they are processed by one of the plurality of processors in the embedded processor complex, and when the egress processing is completed, they are scheduled through the scheduler 40 out of the processing unit 10 and onto the data transmission network through the PMM-DN multiplexed MAC's 36 and the physical layer 38.

Figure 2:
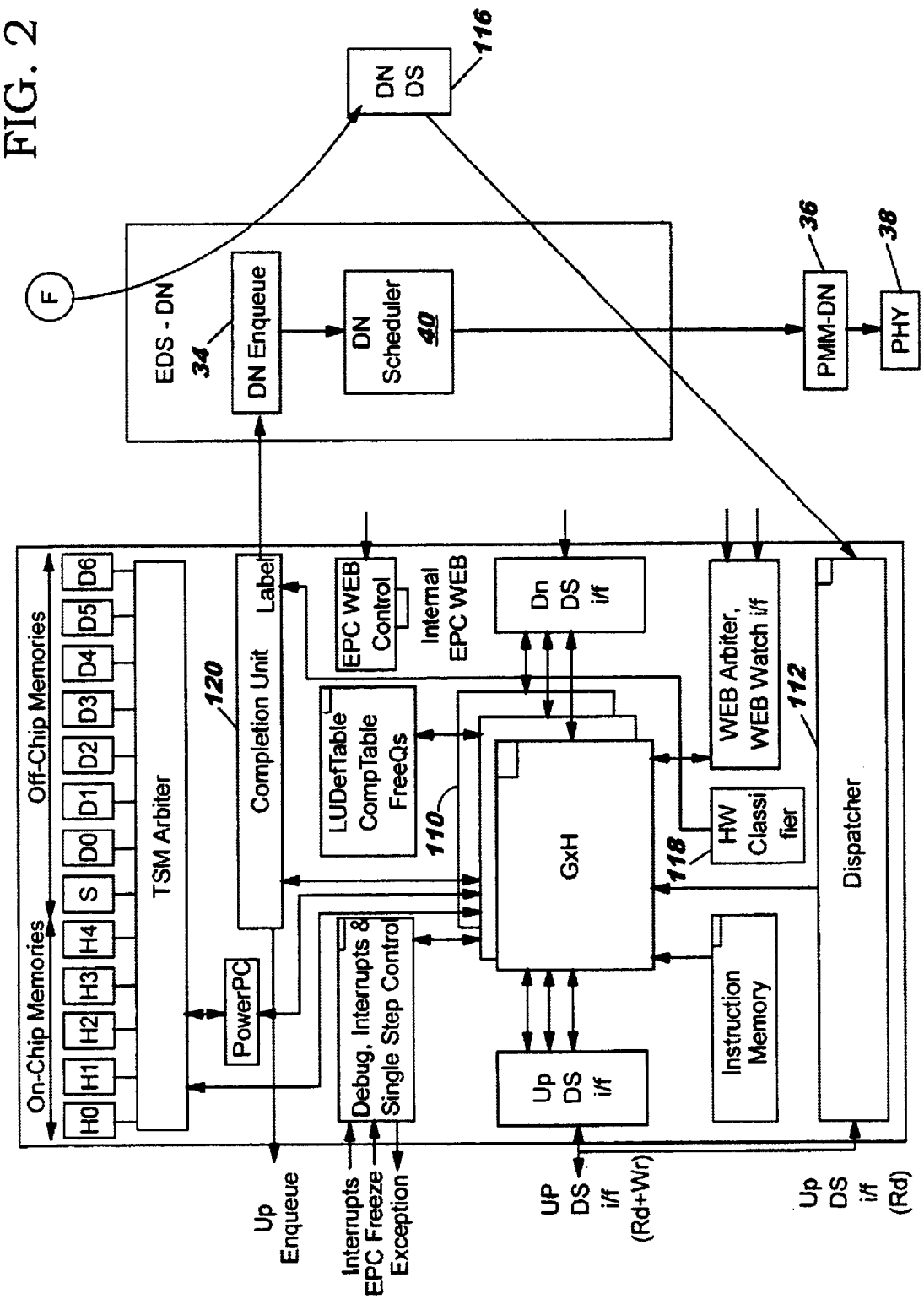
FIG. 2 is a block diagram of an embedded processor complex of type shown in FIG. 1, with the DN Enqueue (and its included Scheduler) useful in understanding the present invention.

FIG. 2 is a block diagram of a processing system in which can employ the present invention to advantage. In this FIG. 2, a plurality of processing units 110 are located between a dispatcher unit 112 and a completion unit 120. Each egress frame F (from a switch, not shown, attached to the present data processing system) is received and stored into a DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent. Interposed between the dispatcher 112 and the plurality of processing units 110 is a hardware classifier assist 116 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled through the PMM DN MAC's 36, then by the DMU data bus to the physical layer 38 (the data transmission network itself).

The basic configuration and operation of the scheduler 40 of the present invention is described in the referenced Scheduler Structure Patent.

Figure 3:
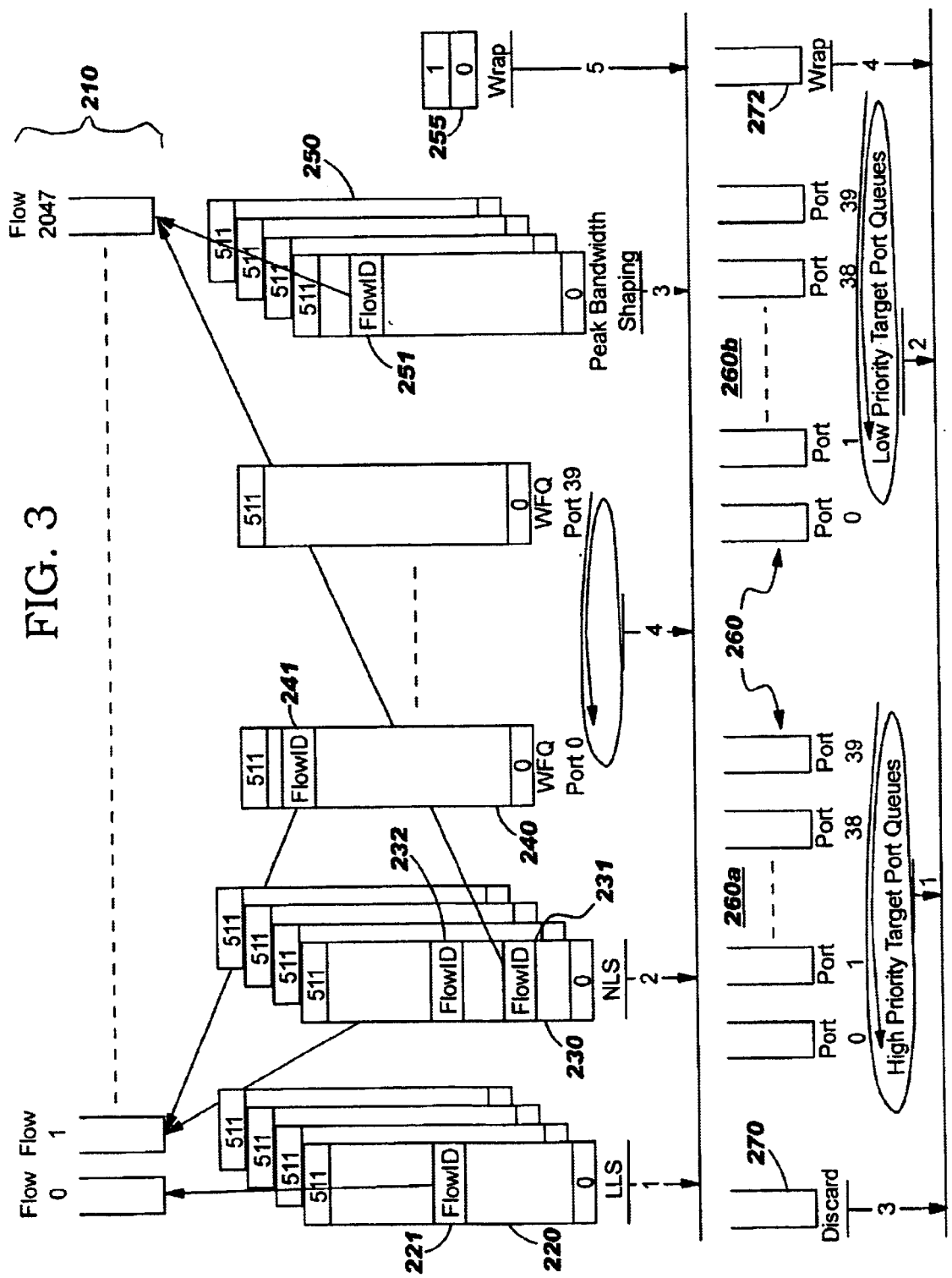
FIG. 3 illustrates a system for scheduling variable length packets in the scheduler of FIG. 2 according to the preferred embodiment of the present invention.

Time based calendars are used for scheduling packets with minimum bandwidth and best effort peak rate requirements. As shown in FIG. 3, three time based calendars are used for this purpose: two for minimum bandwidth and a third calendar used to limit flow queues to a maximum best effort peak rate (peak bandwidth shaping). Two calendars (LLS and NLS) provided for minimum bandwidth allow support of different classes of service within a minimum bandwidth QoS class (i.e. low latency and normal latency).

In the above mentioned calendars, pointers are used to represent a flow queue's location within the calendar. Further there may be none, one, or two such pointers to a single flow queue present in the plurality of calendars in the system. Typically, pointers in a calendar to do not represent un-initialized or empty flow queues. When a pointer to a flow queue is present in a calendar in the system, the flow queue may be referred to as being "In" the calendar.

As described in the Scheduler Structure Patent, a time period is defined as a scheduler_tick. During each scheduler_tick a unit of bandwidth may be serviced. In the preferred embodiment, this unit is defined as a "step" and has the units of time per byte (i.e. 1/Bandwidth).

In a communication system the scope of minimum bandwidth specifications for each flow queue will range through several orders of magnitude. That is, some users (or really, the associated queues for the users) will have a high bandwidth because they are transmitting large amounts of data and have paid for that bandwidth and others have chosen an economy offering to send lower quantities of information (bandwidth) at any time. In order to minimize the amount of hardware dedicated to this purpose, the preferred embodiment uses a scaling technique that permits the use of less hardware while maintaining the range and the accuracy required by a communication system and a service level agreement (SLA).

Figure 4:
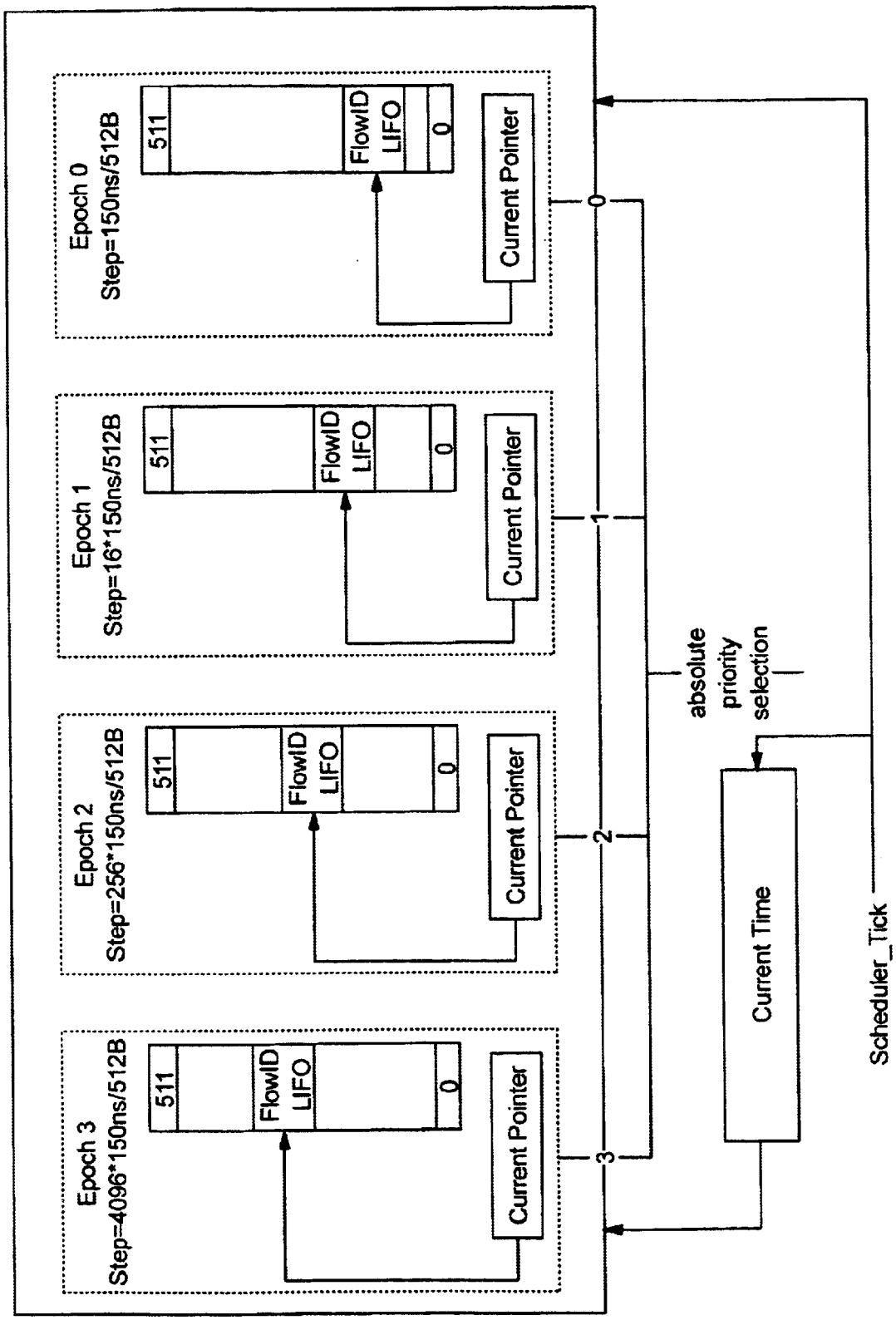
FIG. 4 illustrates a timer based calendar used in the scheduling system of FIG. 3 according to the preferred embodiment of the present invention.

In the preferred embodiment, as shown in FIG. 4, each timer based calendar is comprised of 4 "epochs". Each epoch is comprised of 512 slots. Each slot contains a LIFO stack of pointers to flow queues. The distance between any two slots is a measurement of bandwidth and the value is dependent on the epoch in the preferred embodiment, illustrated in FIG. 4 there is a scaling factor of 16 between each epoch. In the preferred embodiment, a scheduler_tick duration of 150 ns is selected, thus in epoch 0, a distance of 1 slot represents a bandwidth of 512 bytes moved in 150 ns or about 27 Gb/s, while in epoch 3 a distance of 1 slot represents a bandwidth of 512 bytes moved in 0.614 ms or about 6.67 Mb/s.

The number of slots per epoch and the number of epochs utilized in an embodiment is a trade off between hardware cost and design complexity and is not intended to limit the scope of the invention. As will be apparent to one skilled in relevant art, various combinations of epochs, scaling factors between epochs and the number of slots per epoch can be changed without departing from the spirit of the invention.

The Current time is a register that maintains a value for the current scheduler system time. This register is incremented once per scheduler_tick. In the preferred embodiment, the range of the current time register is selected to be four times the range of the timer based scheduler. This allows for the determination of a current time wrap when comparing the current time against one of the time stamp fields found in the flow queue control block (i.e. NextRedTime or NextGreenTime).

Operation

Figure 5:
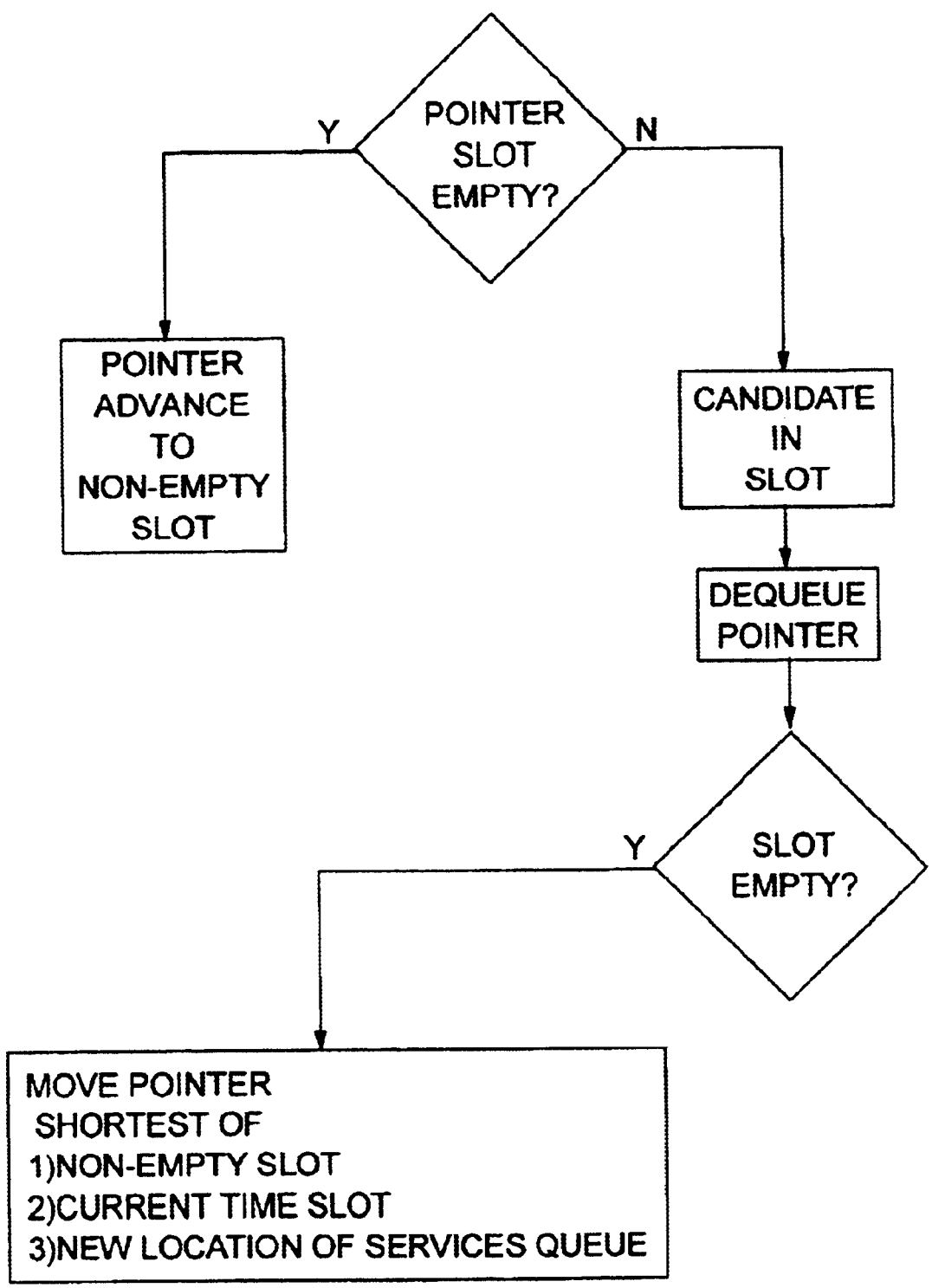
FIG. 5 illustrates a flow chart of the scheduling operation used in connection with the scheduler of FIGS. 3-4.

FIG. 5 illustrates the operation of the scheduler of the present invention in flow chart form. The current pointer is used to indicate the service location within each epoch. During each scheduler_tick, the slot that is indicated by the current pointer is examined. If the slot is found to be empty, then the current pointer may advance to the next non-empty slot, or to the slot corresponding to the current time. Note that since the distance between slots varies between epochs, the current pointer advances through each epoch at different rates while "keeping up" with the current time. If the slot is found to be non-empty, then a flow queue epoch candidate is found. Each epoch independently determines if a flow queue epoch candidate is found. As illustrated in FIG. 4, a flow queue calendar candidate is selected amongst the epoch candidates by the use of an absolute priority selection where the lowest numbered epoch is selected first. As illustrated in FIG. 4, selection order is:

1. Epoch 0
2. Epoch 1
3. Epoch 2
4. Epoch 3.

Final flow queue selection occurs amongst the calendars as described in the Scheduler Structure Patent. When a flow queue epoch candidate is selected, the flow queue pointer is dequeued from the LIFO stack. The flow queue is examined and serviced as described in Scheduler Structure Patent. If the slot indicated by the current pointer is found to be non-empty after this de-queue action, then the current pointer is left unchanged. If the slot indicated by the current pointer is found to be empty after this de-queue action then the current pointer may advance to the next non-empty slot, or to the slot corresponding to the current time, or to the slot where the flow queue service action moved the flow queue which was de-queued from the slot. The current pointer is moved the shortest of these possible distances.

Of course, many modifications of the present invention will be apparent to those skilled in the relevant art in view of the foregoing description of the preferred embodiment, taken together with the accompanying drawings. For example, the number of epochs and the distance of each of their steps, the size of the current time register, the scheduler_tick rate could be changed without departing from the spirit of the present invention. Additionally, many modifications can be made to the system implementation and the system of priorities and various algorithms can be used for determining the priorities without departing from the spirit of the present invention. Further, some of the features of the present invention can be used without the corresponding use of other features. Accordingly, the foregoing description of the preferred embodiment should be considered as merely illustrative of the principles of the present invention and not in limitation thereof.

What is claimed is:

1. An apparatus for periodically moving information units from a plurality of sources to an output destination based on information stored about each of the plurality of sources, the apparatus comprising:
   a first time-based calendar which handles some of the information units based on the information stored about the plurality of sources;
   a second time-based calendar which handles other of the information units based on the information stored about the plurality of sources;
   a third calendar which is time-independent which handles other of the information units based on information stored about the plurality of sources;
   a fourth calendar which handles information units based on limiting peak burst rate, providing a scheduling delay when the peak burst rate exceeds a calculated value;
   a timer which periodically generates a signal which moves a single information unit to the output destination, with the single information unit chosen based on stored rules and calendar search.

2. A method of selecting during any processing cycle one processed information unit from a plurality of information units ready at that time for transmission from a network processor toward a data transmission network, the method comprising:
   receiving priority information about each of the information units ready for processing;
   placing pointers identifying queues with each information unit ready for transmission into at least one slot on one of several prioritized calendars based on the priority information associated with each information unit, wherein at least one of the calendars being time-based scheduling some of the information units based upon predefined bandwidth requirements and at least two of the calendars being time independent scheduling others of the information units based upon non-predefined bandwidth requirement and according to round robin priority selection between the at least two time independent calendars;
   selecting one of the queues to service at each time cycle based on a stored set of rules including location of slot storing the pointers identifying queues and selecting one of the information units from the selected queue according to an algorithm; and
   sending the selected information unit to the network.

3. The apparatus of claim 1 wherein the single information unit chosen based on location on a selected calendar.

4. The apparatus of claim 1 wherein at least one of the time-based calendars, includes n related calendars, n>1, and each one of the n related calendars having m partitions, m>1.

5. The apparatus of claim 4 wherein n=4.

6. The apparatus a claim 5 wherein m=512.

7. The apparatus of claim 4, wherein a scaling factor q separates pairs of the n calendars in each group of calendars so that values assigned to each of the partitions are different for each of the calendars in the same calendar group.

8. The apparatus of claim 7 where q=16.

9. An apparatus for periodically moving information units from a plurality of sources to an output destination based on information stored about each of the plurality of sources, the apparatus comprising:
   a first time-based calendar which handles some of the information units based on the information stored about the plurality of sources;
   a second time-based calendar which handles other of the information units based on the information stored about the plurality of sources;
   a third calendar which is time-independent which handles other of the information units based on information stored about the plurality of sources;
   a fourth calendar which handles information units based on limiting peak burst rate, providing a scheduling delay when the peak burst rate exceeds a calculated value;
   a timer which periodically generates a signal which moves a single information unit to the output destination, with the single information unit chosen based on stored rules and calendar search; and
   at least one location associated with at lest one of the time-based calendars, said one location maintaining at least one pointer identifying one of the plurality of sources.

10. An apparatus for indicating when an information unit is to be moved from one of a plurality of sources to an output destination comprising:
    n calendars where n>1, each calendar partitioned into m slots with m>1 and a scaling factor q separating pairs of calendars so that slots on different calendars represent different bandwidth;
    a register storing values representative of current time, said register having an output that advance between slots on at least one of the n calendars;
    a current pointer associated with the at least one of the n calendars and having an output that indexes between slots of the at least one of the n calendars; and
    an algorithm to select one of the n calendars which identify one of the sources from which the information unit is transmitted.

11. The apparatus of claim 10 further including a control signal that periodically increments the registers.

12. The apparatus of claim 11 wherein the control signal increments the current pointer to advance from one slot to the next.

13. The apparatus of claim 10 further including at least one identification pointer placed at a selected slot of at least one of the n calendars and identifying at least one of the plurality of sources.

14. A method to select information units to be transmitted from a plurality of sources to a transmission network comprising:

providing n calendars wherein n>1 and each calendar having m slots m>1 with slots in different calendars representing different bandwidth;

queuing the information units in queues;

placing indicia identifying queues with information units ready for transmission, at selected slots on selected ones of the n calendars, based upon priority information associated with each information unit;

establishing a processing interval;

searching each of the n calendars within the processing interval to detect a location at which an indicia is set to a state identifying a queue with information unit ready for transmission;

selecting the queue associated with the set indicia only if one location is set; and sending selected information unit from the queue so selected to the network.

15. The method set forth in claim 14 wherein if set indicia are detected at slots in different ones of the n calendars selecting one of the slots based upon an algorithm.

* * * * *